(12) United States Patent
Ghannam et al.

(10) Patent No.: US 10,633,023 B2
(45) Date of Patent: Apr. 28, 2020

(54) SYSTEM AND METHOD FOR TRAILER-CAR INITIAL HITCHING ANGLE DETECTION BY FORCE-BASED SENSING SYSTEM

(71) Applicant: Ford Global Technologies, LLC, Dearborn, MI (US)

(72) Inventors: Mahmoud Yousef Ghannam, Canton, MI (US); Swadad A. Carremm, Canton, MI (US); Saied Nusier, Canton, MI (US); Erick Michael Lavoie, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 291 days.

(21) Appl. No.: 15/790,823

(22) Filed: Oct. 23, 2017

(65) Prior Publication Data
US 2019/0118859 A1   Apr. 25, 2019

(51) Int. Cl.
| | | |
|---|---|---|
| *B64D 13/06* | (2006.01) | |
| *B60D 1/36* | (2006.01) | |
| *B60R 1/00* | (2006.01) | |
| *B62D 6/00* | (2006.01) | |
| *B60D 1/06* | (2006.01) | |
| *B60D 1/145* | (2006.01) | |
| *B62D 13/06* | (2006.01) | |

(52) U.S. Cl.
CPC ............... *B62D 13/06* (2013.01); *B60D 1/36* (2013.01); *B60R 1/003* (2013.01); *B62D 6/005* (2013.01); *B60D 1/06* (2013.01); *B60D 1/145* (2013.01)

(58) Field of Classification Search
CPC ........ B62D 13/06; B62D 6/005; B60R 1/003; B60D 1/36; B60D 1/145; B60D 1/06
See application file for complete search history.

(56) References Cited

U.S. PATENT DOCUMENTS

| | | | | |
|---|---|---|---|---|
| 4,483,076 A | * | 11/1984 | Btooks ...................... | G01B 7/32 33/123 |
| 5,108,123 A | * | 4/1992 | Rubenzik ................. | B60D 1/36 280/477 |
| 6,120,052 A | * | 9/2000 | Capik et al. ............. | B60D 1/36 280/477 |
| 8,038,166 B1 | * | 10/2011 | Piesinger ................. | B60D 1/36 280/477 |
| 8,888,121 B2 | * | 11/2014 | Trevino et al. .......... | B60D 1/36 280/477 |
| 9,266,401 B2 | | 2/2016 | Klank et al. | |
| 9,610,975 B1 | | 4/2017 | Hu et al. | |
| (Continued) | | | | |

FOREIGN PATENT DOCUMENTS

| | | |
|---|---|---|
| DE | 102014224808 A1 | 6/2016 |
| WO | 9102226 A1 | 2/1991 |

OTHER PUBLICATIONS

Wahlde, R.V., A Hitch Angle Measurement Device, Army Research Laboratory, Sep. 1998, 46 pages.

*Primary Examiner* — Dale W Hilgendorf
(74) *Attorney, Agent, or Firm* — Raymond Coppiellie; Price Heneveld LLP

(57) ABSTRACT

A vehicle-trailer hitch angle sensor assembly includes a mounting bracket including a base, a body rotatably coupled with the bracket about an axis spaced apart from the base and biased toward the base, and a sensor array including a plurality of sensors extending in first and second directions along a face of the body.

20 Claims, 11 Drawing Sheets

(56) References Cited

U.S. PATENT DOCUMENTS

| | | | |
|---|---|---|---|
| 9,880,560 B2* | 1/2018 | Han et al. | B60R 11/04 |
| 2005/0053525 A1* | 3/2005 | Segal et al. | G01N 27/4146 |
| | | | 422/88 |
| 2005/0074143 A1* | 4/2005 | Kawai | B60D 1/36 |
| | | | 382/104 |
| 2005/0128059 A1* | 6/2005 | Vause | B60D 1/36 |
| | | | 340/431 |
| 2009/0005932 A1* | 1/2009 | Lee et al. | B60D 1/30 |
| | | | 701/41 |
| 2014/0085472 A1* | 3/2014 | Lu et al. | B60R 1/002 |
| | | | 348/148 |
| 2017/0008559 A1 | 1/2017 | Shepard | |

* cited by examiner

SYSTEM AND METHOD FOR TRAILER-CAR INITIAL HITCHING ANGLE DETECTION BY FORCE-BASED SENSING SYSTEM

FIELD OF THE DISCLOSURE

The present disclosure generally relates to a trailer backup assist system for use with a vehicle, and, more particularly, a hitch angle sensor assembly for such a system to monitor a hitch angle between the vehicle and the trailer being reversed.

BACKGROUND OF THE DISCLOSURE

It is well known that backing up a vehicle with a trailer attached is a difficult task for many drivers. This is particularly true for drivers that are untrained at backing with trailers such as, for example, those that drive with an attached trailer on an infrequent basis (e.g., have rented a trailer, use a personal trailer on an infrequent basis, etc.). One reason for such difficulty is that backing a vehicle with an attached trailer requires counter-steering that is opposite to normal steering when backing the vehicle without a trailer attached and/or requires braking to stabilize the vehicle-trailer combination before a jack-knife condition occurs. Another such reason for such difficulty is that small errors in steering while backing a vehicle with an attached trailer are amplified thereby causing the trailer to depart from a desired path.

Accordingly, various approaches for backing a trailer that provide simplified human machine interfaces and that overcome at least some of the difficulties in reversing a trailer using a vehicle have been developed. Most of such systems require some way to monitor the trailer position relative to the vehicle, which is typically done by monitoring the angle of the trailer with respect to the vehicle to which it is coupled along a point of such coupling. Some systems, for example, track a marker or the like that must be assembled with the particular trailer coupled with the vehicle, meaning that towing of multiple trailers with a single vehicle requires such makers to be fixed with all of such trailers, and for the position of such fixation to be known by the vehicle. Other systems have been developed to estimate the hitch angle using vehicle dynamics; however, many such systems require other characteristics of the trailer to be known by the vehicle, meaning that such characteristics must be entered into system memory within the vehicle and recalled in connection with the particular trailer being reversed. Accordingly, improvements to trailer position tracking may be desired or otherwise useful.

SUMMARY OF THE DISCLOSURE

According to one aspect of the present disclosure, a vehicle-trailer hitch angle sensor assembly includes a mounting bracket including a base, a body rotatably coupled with the bracket about an axis spaced apart from the base and biased toward the base, and a sensor array including a plurality of sensors extending in first and second directions along a face of the body.

Embodiments of the first aspect of the invention can include any one or a combination of the following features:
  the mounting bracket further includes an extension portion extending away from the base to the axis, and the body is biased toward the base into a first position wherein a portion of the first face is positioned adjacent the extension portion of the mounting bracket.
  the base extends away from the body when in the first position.
  the body is rotatably coupled with the bracket about a hinge having respective first and second portions defined by the body and the mounting bracket.
  the hitch angle sensor assembly further includes a spring operably engaged between the mounting bracket and the body, wherein the spring biases the body toward the base.
  the sensors in the sensor array extend away from the axis in the first direction in a plurality of rows and generally parallel with the axis in the second direction in a plurality of columns.
  the first direction in which the sensors in the sensor array extend is a radial direction and the second direction in which the sensors extend is an arcuate direction, and the sensors in the sensor array extend in the first direction in a plurality of rays having a common origin and in the second direction in a plurality of concentric arcs about the origin.

According to another aspect of the present disclosure, a system for assisting in reversing of a vehicle-trailer combination includes a vehicle steering system and a sensor assembly. The sensor assembly includes a mounting bracket coupled with a receiver of the vehicle, a body rotatably coupled with the bracket about an axis spaced apart from the base and biased toward the receiver, and a sensor array including a plurality of sensors extending in first and second directions along a face of the body. A controller is in electronic communication with the sensor array and determines a hitch angle between a trailer and a vehicle in the vehicle-trailer combination based on an input from the plurality of sensors.

According to another aspect of the present disclosure, a vehicle includes a hitch receiver coupled with a frame of the vehicle and exposed at a rear of the vehicle and a sensor assembly. The sensor assembly has a mounting bracket coupled with a receiver of the vehicle, a body rotatably coupled with the bracket about an axis spaced apart from the base and biased toward the receiver, and a sensor array including a plurality of sensors extending in first and second directions along a face of the body.

These and other aspects, objects, and features of the present disclosure will be understood and appreciated by those skilled in the art upon studying the following specification, claims, and appended drawings.

DETAILED DESCRIPTION OF THE PREFERRED EMBODIMENTS

Figure 1:
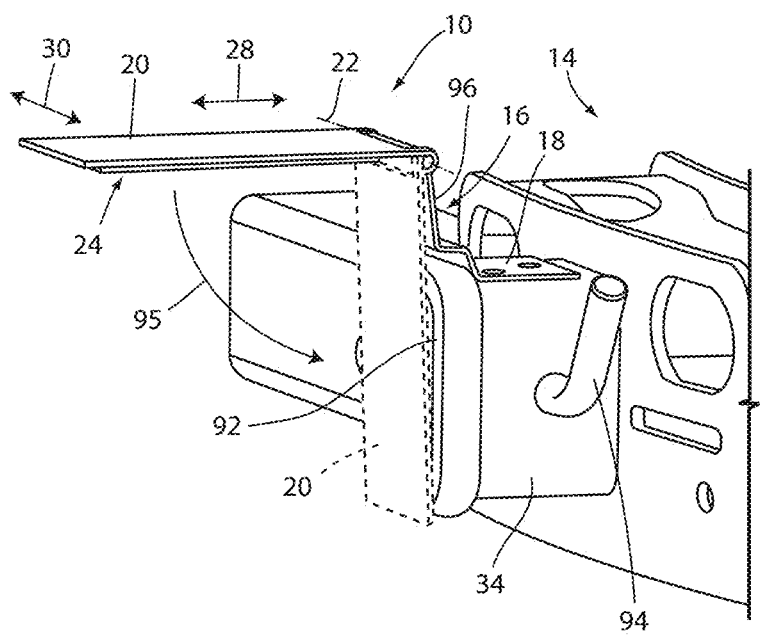
FIG. 1 is a perspective view of a hitch angle sensor assembly assembled with a hitch assembly of a vehicle.

For purposes of description herein, the terms "upper," "lower," "right," "left," "rear," "front," "vertical," "horizontal," "interior," "exterior," and derivatives thereof shall relate to the device as oriented in FIG. 1. However, it is to be understood that the device may assume various alternative orientations, except where expressly specified to the contrary. It is also to be understood that the specific devices and processes illustrated in the attached drawing, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise. Additionally, unless otherwise specified, it is to be understood that discussion of a particular feature of component extending in or along a given direction or the like does not mean that the feature or component follows a straight line or axis in such a direction or that it only extends in such direction or on such a plane without other directional components or deviations, unless otherwise specified.

Referring to FIGS. 1-14, reference numeral 10 generally designates a hitch angle sensor assembly for use in monitoring a hitch angle γ between a trailer 12 and a vehicle 14 to which the trailer 12 is coupled in a resulting vehicle 14 and trailer 12 combination. The hitch angle sensor assembly 10 includes a mounting bracket 16 having a base 18 and a body 20 rotatably coupled with the bracket 16 about an axis 22 that is spaced apart from the base 18 and is biased toward the base 18. The hitch angle sensor assembly 10 further includes a sensor array 24 including a plurality of sensors 26 extending in a first direction 28 and a second direction 30 along a face 32 of the body 20.

Figure 2:
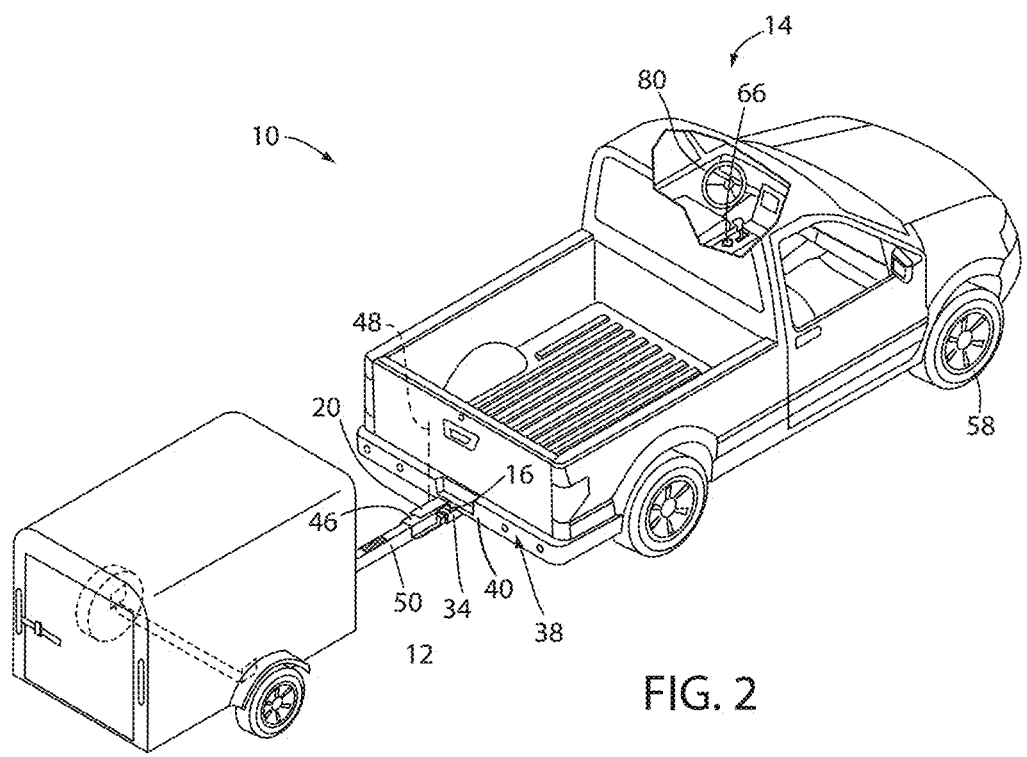
FIG. 2 is a top perspective view of a vehicle including the sensor assembly attached to a trailer and including a trailer backup assist system utilizing the hitch angle sensor assembly.

As shown in FIG. 2, the hitch angle sensor assembly 10 is affixable with the vehicle 14, particularly to a hitch ball receiver 34 rigidly coupled with a tow bar 36 (FIG. 7) that is, in turn coupled with the frame of the vehicle 14 to rigidly retain receiver 34 with vehicle 14. As further shown in FIG. 2, receiver 34 is positioned so as to be accessible at the rear of vehicle 14, which in the example shown is achieved by positioning receiver 34 beneath the rear bumper of vehicle 14, although other arrangements are possible (including having receiver 34 positioned within or behind bumper 40 with an opening therethrough for access to receiver 34). Receiver 34 is configured to receive a ball mount 42 (FIG. 8) for coupling of a hitch ball 44 (FIG. 8) to the rear 38 of vehicle 14.

Trailer 12 includes a coupler 46 that is configured to receive and engage with hitch ball 44 to couple trailer 12 so as to be pivotable about a coupling point 48 defined between coupler 46 and hitch ball 44. Coupler 46 is rigidly affixed with a tongue 50 of trailer 12 such that attachment between coupler 46 and hitch ball 44 retains trailer 12 with vehicle 14. Coupler 46, hitch ball 44, ball mount 42, and receiver 34 can take any of a number of known configurations, depending on the trailer 12 type and configuration, as well as the vehicle 14 type and configuration and towing demands or capability of vehicle 14. In this manner, and according to the general principles discussed herein, the hitch angle sensor assembly 10 can be configured such that body 20 can be positioned to extend adjacent a portion of trailer 12, including at least one of coupler 46 (or a component thereof) or an portion of tongue 50 extending thereof and to maintain at least some of the sensors 26 within sensor array 24 against coupler 46 and/or tongue 50. As discussed further below, by monitoring the sensors 26 that indicate contact with the trailer 12, the position of the sensors 26 relative to receiver 34 being known, hitch angle sensor assembly 10 can be used to determine the hitch angle γ between trailer 12 and vehicle 14 about coupling point 48. In one embodiment, the hitch angle γ determined using hitch angle sensor assembly 10 can be used as a control parameter or input to a trailer backup assist system 52 (FIG. 3) within vehicle 14 that assists in a backing or reversing maneuver of trailer 12 when coupled with vehicle 14.

Figure 3:
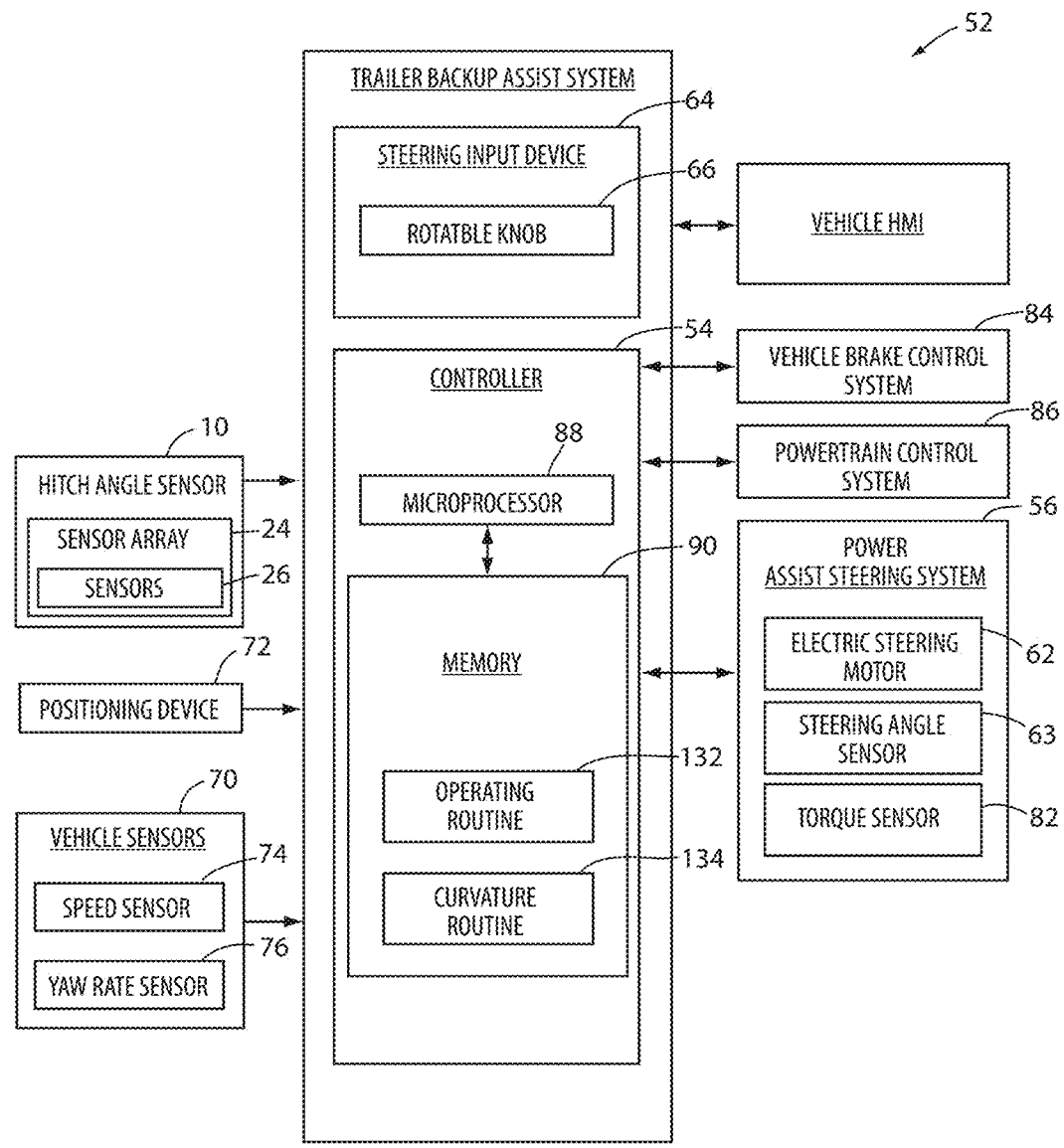
FIG. 3 is a block diagram illustrating one embodiment of the trailer backup assist system.
Figure 4:
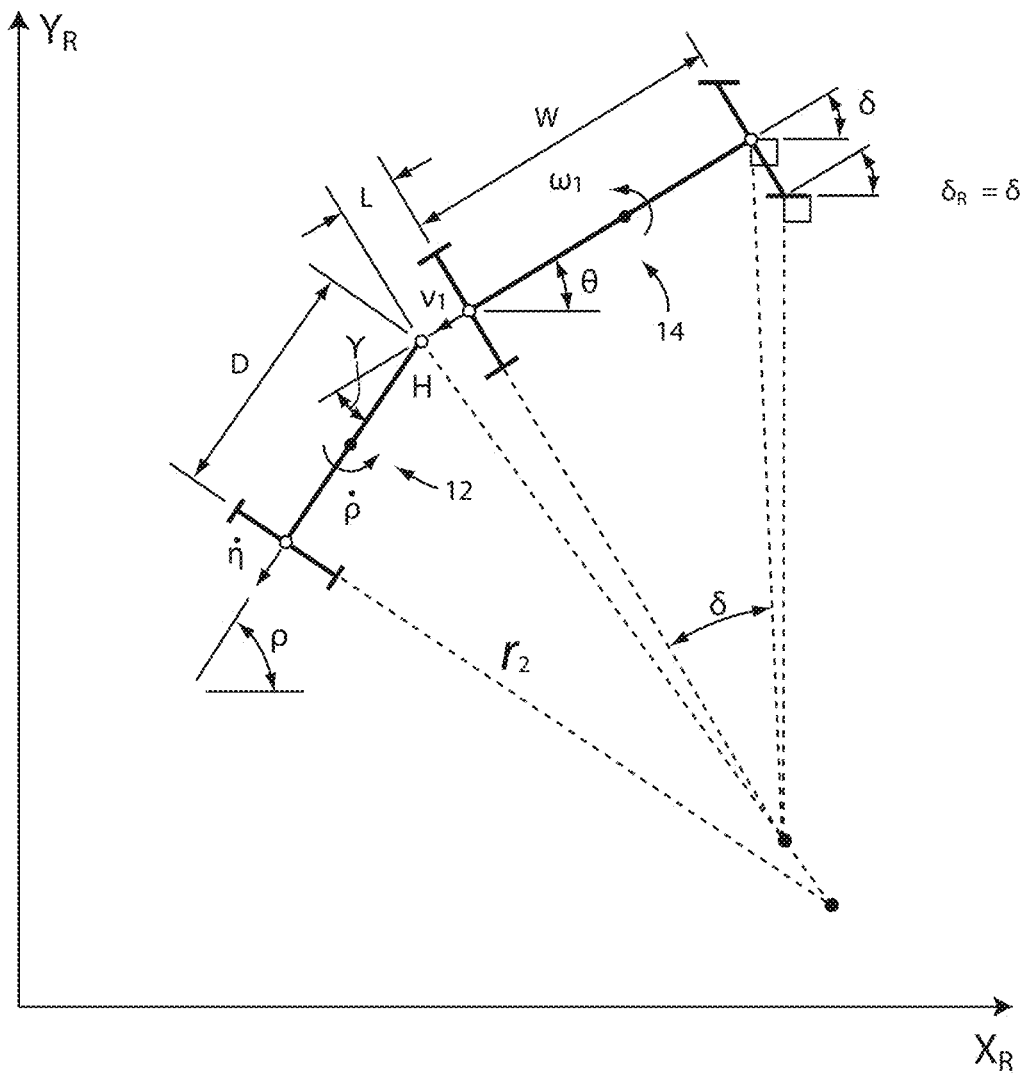
FIG. 4 is a schematic diagram that illustrates the geometry of a vehicle and a trailer overlaid with a two-dimensional x-y coordinate system, identifying variables used to determine a kinematic relationship of the vehicle and the trailer for the trailer backup assist system, according to one embodiment.
Figure 5:
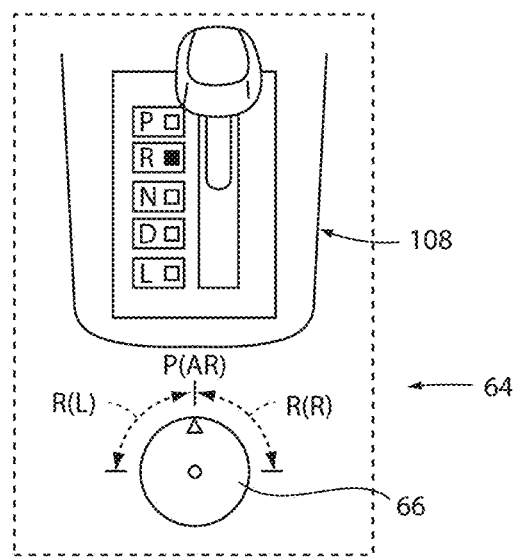
FIG. 5 is a plan view of a steering input device having a rotatable knob for operating the trailer backup assist system, according to one embodiment.

In the example illustrated in FIGS. 3-5, the backup assistance system 52 can include a controller 54 in electronic communication with the sensor array 24 of hitch angle sensor assembly 10 and programmed or otherwise configured to determine the hitch angle γ by way of input from the sensor array 24 and/or the individual sensors 26 included therein. The controller 54 is further in communication with a power assist steering system 56 of vehicle 14 to control the steered wheels 58 (FIG. 2) of vehicle 14 to maintain the trailer 12 along a predetermined backing path 60 (FIG. 6) based at least in part on a kinematic model of the vehicle 14 and trailer 12 combination that utilizes the hitch angle γ measurement determined using hitch angle sensor assembly 10.

As shown in FIGS. 1 and 2, trailer backup assist system 52 may generally be useable for controlling a backing path 60 (FIG. 6) of a trailer 12 attached to a vehicle 14 by allowing a driver of the vehicle 14 to specify a desired curvature $\kappa_2$ of the backing path 60 of the trailer 12. In one embodiment, the trailer backup assist system 52 automatically steers the vehicle 14 to guide the trailer 12 on the desired curvature $\kappa_2$ or backing path 60 as a driver uses the accelerator and brake pedals to control the reversing speed of the vehicle 14. As mentioned above, hitch angle sensor assembly 10 is employed to monitor the position of the trailer 12 relative to the vehicle 14 by providing data used to determine the hitch angle $\gamma$ between the trailer 12 and the vehicle 14 about coupling point 48.

With respect to the general operation of the trailer backup assist system 52, a steering input device 64 may be provided, such as a rotatable, or otherwise moveable, knob 66, for a driver to provide the desired curvature $\kappa_2$ of the trailer 12. As such, the steering input device 64 may be operable between a plurality of selections, such as successive rotated positions of knob 66, that each provide an incremental change to the desired curvature $\kappa_2$ of the trailer 12. Upon inputting the desired curvature $\kappa_2$, the controller 54 may generate a steering command for the vehicle 14 to guide the trailer 12 on the desired curvature $\kappa_2$ based on the estimated hitch angle $\gamma$ and a kinematic relationship between the trailer 12 and the vehicle 14.

Figure 8:
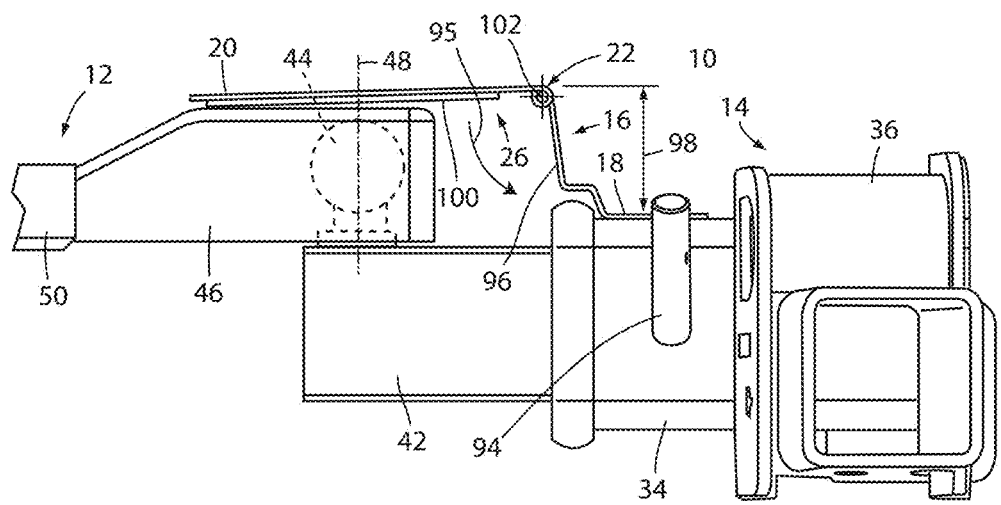
FIG. 8 is a side detail view of a portion of a trailer coupled with a hitch ball associated with the hitch angle sensor assembly of FIG. 7.

With reference to the embodiment shown in FIG. 2, the vehicle 14 is a pickup truck embodiment that is equipped with one embodiment of the trailer backup assist system 52 for controlling the backing path 60 (FIG. 6) of the trailer 12 that is attached to the vehicle 14. Specifically, the vehicle 14 is pivotally attached to one embodiment of the trailer 12 that has a single axle having a right wheel assembly and a left wheel assembly, and tongue 50 longitudinally extending rearward from coupler 46 that is connected to hitch ball 44 (FIG. 8). The coupler 46 latches onto the hitch ball 44 to provide an implementation of the above-described pivoting ball joint connection that defines coupling point 48 and allows for articulation of the hitch angle $\gamma$. It is also contemplated that additional embodiments of the trailer 12 may include more than one axle and may have various shapes and sizes configured for different loads and items, such as a boat trailer or a flatbed trailer.

With reference to the embodiment of the trailer backup assist system 52 shown in FIG. 3, the hitch angle sensor assembly 10 is shown in connection with controller 54. The illustrated embodiment of the trailer backup assist system 52 may receive vehicle 14 and trailer 12 status-related information from additional sensors and devices 70. This information includes, for example, positioning information from a positioning device 72, which may include a global positioning system (GPS) on the vehicle 14 or a handheld device, to determine a coordinate location of the vehicle 14 and the trailer 12 based on the location of the positioning device 72 with respect to the trailer 12 and/or the vehicle 14 and based on the hitch angle $\gamma$. The positioning device 72 may additionally or alternatively include a dead reckoning system for determining the coordinate location of the vehicle 14 and the trailer 12 within a localized coordinate system based at least on vehicle speed $v_1$, steering angle $\delta$, and hitch angle $\gamma$. Other vehicle information received by the trailer backup assist system 52 may include a speed of the vehicle 14 from a speed sensor 74 and a yaw rate $\omega_1$ of the vehicle 14 from a vehicle yaw rate sensor 76.

As further shown in FIG. 3, one embodiment of the trailer backup assist system 52 is in communication with a power assist steering system 56 of the vehicle 14 to operate the steered wheels 58 (FIG. 2) of the vehicle 14 for moving the vehicle 14 in such a manner that the trailer 12 reacts in accordance with the desired curvature $\kappa_2$ of the trailer 12. In the illustrated embodiment, the power assist steering system 56 is an electric power-assisted steering (EPAS) system that includes an electric steering motor 62 for turning the steered wheels 58 to a steering angle $\delta$ based on a steering command, whereby the steering angle $\delta$ may be sensed by a steering angle sensor 63 of the power assist steering system 56. The steering command may be provided by the trailer backup assist system 52 for autonomously steering during a backup maneuver and may alternatively be provided manually via a rotational position of a steering wheel 80 (FIG. 2).

Referring again to the embodiment illustrated in FIG. 3, the power assist steering system 56 provides the controller 54 of the trailer backup assist system 52 with information relating to a rotational position of steered wheels 58 of the vehicle 14, including a steering angle $\delta$. The controller 54 in the illustrated embodiment processes the current steering angle $\delta$, in addition to other vehicle 14 and trailer 12 conditions to guide the trailer 12 along the desired curvature $\kappa_2$. It is conceivable that the trailer backup assist system 52, in additional embodiments, may be an integrated component of the power assist steering system 56. For example, the power assist steering system 56 may include a trailer backup assist algorithm for generating vehicle steering information and commands as a function of all or a portion of information received from the steering input device 64, the hitch angle sensor assembly 10, the power assist steering system 56, a vehicle brake control system 84, a powertrain control system 86, and other vehicle sensors and devices.

As also illustrated in FIG. 3, the vehicle brake control system 84 may also communicate with the controller 54 to provide the trailer backup assist system 52 with braking information, such as vehicle wheel speed, and to receive braking commands from the controller 54. For instance, vehicle speed information can be determined from individual wheel speeds as monitored by the brake control system 84. Vehicle speed $v_1$ may also be determined from the powertrain control system 86, the speed sensor 74, and the positioning device 72, among other conceivable means. In some embodiments, individual wheel speeds can also be used to determine a vehicle yaw rate $\omega_1$, which can be provided to the trailer backup assist system 52 in the alternative or in addition to the vehicle yaw rate sensor 76. In certain embodiments, the trailer backup assist system 52 can provide vehicle braking information to the brake control system 84 for allowing the trailer backup assist system 52 to control braking of the vehicle 14 during backing of the trailer 12. For example, the trailer backup assist system 52 in some embodiments may regulate speed of the vehicle 14 during backing of the trailer 12, which can reduce the potential for unacceptable trailer backup conditions. The powertrain control system 86, as shown in the embodiment illustrated in FIG. 3, may also interact with the trailer backup assist system 52 for regulating speed and acceleration of the vehicle 14 during backing of the trailer 12.

As further illustrated in FIG. 3, the trailer backup assist system 52 includes a steering input device 64 that is connected to the controller 54 for allowing communication of information therebetween. It is disclosed herein that the steering input device 64 can be coupled to the controller 54 in a wired or wireless manner. The steering input device 64 provides the trailer backup assist system 52 with information defining the desired backing path 60 (FIG. 6) of travel of the trailer 12 for the controller 54 to process and generate steering commands. More specifically, the steering input device 64 may provide a selection or positional information that correlates with a desired curvature $\kappa_2$ of the desired backing path 60 of travel of the trailer 12. Also, the trailer steering commands provided by the steering input device 64 can include information relating to a commanded change in the path of travel, such as an incremental change in the desired curvature $\kappa_2$, and information relating to an indication that the trailer 12 is to travel along a path defined by a longitudinal centerline axis of the trailer 12, such as a desired curvature value of zero that defines a substantially straight path of travel for the trailer 12. The steering input device 64 according to one embodiment may include a movable control input device for allowing a driver of the vehicle 14 to command desired trailer steering actions or otherwise select and alter a desired curvature $\kappa_2$. For instance, the moveable control input device may be a rotatable knob 66, which can be rotatable about a rotational axis extending through a top surface or face of the knob 66. In other embodiments, the rotatable knob 66 may be rotatable about a rotational axis extending substantially parallel to a top surface or face of the rotatable knob 66. Furthermore, the steering input device 64, according to additional embodiments, may include alternative devices for providing a desired curvature $\kappa_2$ or other information defining a desired backing path 60, such as a joystick, a keypad, a series of depressible buttons or switches, a sliding input device, various user interfaces on a touch-screen display, a vision based system for receiving gestures, a control interface on a portable device, and other conceivable input devices as generally understood by one having ordinary skill in the art. It is contemplated that the steering input device 64 may also function as an input device for other features, such as providing inputs for other vehicle features or systems.

Still referring to the embodiment shown in FIG. 3, the controller 54 is configured with a microprocessor 88 to process logic and routines stored in memory 90 that receive information from the hitch angle sensor assembly 10 (including from the sensors 26 in sensor array 24 individually or in a resulting signal from a readout circuit included in hitch angle sensor assembly 10), the steering input device 64, the power assist steering system 56, the vehicle brake control system 84, a trailer braking system, the powertrain control system 86, and other vehicle sensors and devices. The controller 54 may generate vehicle steering information and commands as a function of all or a portion of the information received. Thereafter, the vehicle steering information and commands may be provided to the power assist steering system 56 for affecting steering of the vehicle 14 to achieve a commanded path of travel for the trailer 12. The controller 54 may include the microprocessor 88 and/or other analog and/or digital circuitry for processing one or more routines. Also, the controller 54 may include the memory 90 for storing one or more routines, including an operating routine 132, and a curvature routine 134. It should be appreciated that the controller 54 may be a stand-alone dedicated controller or may be a shared controller integrated with other control functions, such as integrated with the power assist steering system 56, and other conceivable onboard or off-board vehicle control systems.

With reference to FIG. 4, we now turn to a discussion of vehicle and trailer information and parameters used to calculate a kinematic relationship between a curvature of a path of travel of the trailer 12 and the steering angle $\delta$ of the vehicle 14 towing the trailer 12, which can be desirable for a trailer backup assist system 52 configured in accordance with some embodiments, including for use by a curvature routine 134 of the controller 54 (FIG. 3) in one embodiment. As shown in FIG. 4, for a system defined by a vehicle 14 and a trailer 12, a vehicle-trailer model of the kinematic relationship, as illustrated and described below, is based on various parameters associated with the vehicle 14 and the trailer 12. These parameters include:

$\delta$: steering angle at steered front wheels 58 of the vehicle 14;
$\theta$: yaw angle of the vehicle 14;
$\rho$: yaw angle of the trailer 12;
$\gamma$: hitch angle ($\gamma=\rho-\theta$);
W: wheel base of the vehicle 14;
L: drawbar length between coupling point 48 and rear axle of the vehicle 14;
D: distance (trailer length) between coupling point 48, H and the axle of the trailer 12 or effective axle for a multiple axle trailer; and
$r_2$: curvature radius for the trailer 12.

One embodiment of a kinematic relationship between trailer path radius of curvature $r_2$ at the midpoint of an axle of the trailer 12, steering angle $\delta$ of the steered wheels 58 of the vehicle 14, and the hitch angle $\gamma$ can be expressed in the equation provided below. As such, if the hitch angle $\gamma$ is provided, the trailer path curvature $\kappa_2$ can be controlled based on regulating the steering angle $\delta$ (where $\dot{\rho}$ is trailer yaw rate and $\dot{\eta}$ is trailer velocity).

$$\kappa_2 = \frac{1}{r_2} = \frac{\dot{\rho}}{\dot{\eta}} = \frac{\left(W + \frac{Kv_1^2}{g}\right)\sin\gamma + L\cos\gamma\tan\delta}{D\left(\left(W + \frac{Kv_1^2}{g}\right)\cos\gamma - L\sin\gamma\tan\delta\right)} \quad (1)$$

This relationship can be expressed to provide the steering angle $\delta$ as a function of desired trailer path curvature $\kappa_2$ and hitch angle $\gamma$.

$$\delta = \tan^{-1}\left(\frac{\left(W + \frac{Kv_1^2}{g}\right)[\kappa_d D\cos\gamma - \sin\gamma]}{DL\kappa_d \sin\gamma + L\cos\gamma}\right) = F(\gamma, \kappa_d, K) \quad (2)$$

Accordingly, for a particular vehicle 14 and trailer 12 combination, certain parameters (e.g., D, W and L) of the kinematic relationship are constant and assumed known. $v_1$ is the vehicle longitudinal speed and g is the acceleration due to gravity. K is a speed dependent parameter which, when set to zero, makes the calculation of steering angle independent of vehicle speed. For example, vehicle-specific parameters of the kinematic relationship in the form of relevant dimensions can be predefined in an electronic control system of the vehicle 14 and trailer-specific parameters of the kinematic relationship can be inputted by a driver of the vehicle 14, determined from sensed trailer behavior in response to vehicle steering commands, or otherwise determined from signals provided by the trailer 12. Desired trailer path curvature $\kappa_2$ can be determined from the driver input via the steering input device 64. Through the use of the equation for providing steering angle $\delta$, a corresponding steering command can be generated by the curvature routine 134 for controlling the power assist steering system 56 of the vehicle 14.

Figure 6:
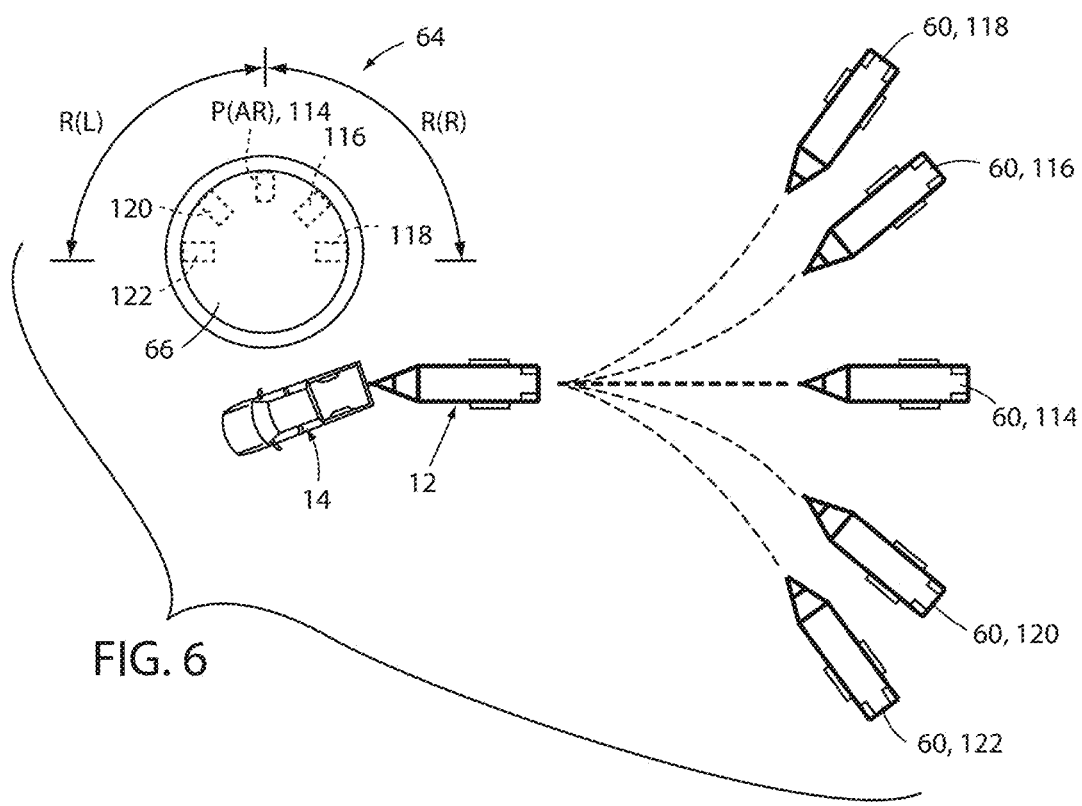
FIG. 6 is a plan view of another embodiment of a rotatable knob for selecting a desired curvature of a trailer and a corresponding schematic diagram illustrating a vehicle and a trailer with various trailer curvature paths correlating with desired curvatures that may be selected.

Referring now to FIGS. 5 and 6, one embodiment of the steering input device 64 is illustrated disposed on a center console 108 of the vehicle 14 proximate a shifter, for example. In this embodiment, the steering input device 64 includes an implementation of the above-referenced rotatable knob 66 for providing the controller 54 (FIG. 3) with the desired curvature $\kappa_2$ of the trailer 12. More specifically, the angular position of the rotatable knob 66 may correlate with a curvature input, such that rotation of the knob 66 to a different angular position provides a different commanded curvature $\kappa_2$ with an incremental change based on the amount of rotation and, in some embodiments, a normalized rate, as described in greater detail herein.

The rotatable knob 66, as illustrated in FIG. 6, may be biased (e.g., by a spring return) to a center, or at-rest position P(AR) between opposing rotational ranges of motion R(R), R(L). In the illustrated embodiment, a first one of the opposing rotational ranges of motion R(R) is substantially equal to a second one R(L) of the opposing rotational ranges of motion R(L), R(R). To provide a tactile indication of an amount of rotation of the rotatable knob 66, a torque that biases the knob 66 toward the at-rest position P(AR) can increase (e.g., non-linearly) as a function of the amount of rotation of the rotatable knob 66 with respect to the at-rest position P(AR). Additionally, the rotatable knob 66 can be configured with position indicating detents such that the driver can positively feel the at-rest position P(AR) and feel the ends of the opposing rotational ranges of motion R(L), R(R) approaching (e.g., soft end stops). The rotatable knob 66 may generate a desired curvature $\kappa_2$ value as a function of an amount of rotation of the rotatable knob 66 with respect to the at-rest position P(AR) and a direction of movement of the rotatable knob 66 with respect to the at-rest position P(AR), which itself may correspond to a zero-curvature command. As shown in FIG. 6, it is also contemplated that the rotation of the rotatable knob 66 may also be used to determine the desired curvature $\kappa_2$ output to the controller 54. The at-rest position P(AR), 114 of the knob 66 corresponds to a signal indicating that the vehicle 14 should be steered such that the trailer 12 is backed along a substantially straight backing path 60 (as indicated by the numbering of the position 114 of knob 66 corresponding with the particular path 60 achieved and corresponding therewith) corresponding with a zero trailer curvature request from the driver, as defined by the longitudinal axis of the trailer 12 when the knob 66 was returned to the at-rest position P(AR). A maximum clockwise and anti-clockwise position of the knob 66 (i.e., limits of the opposing rotational ranges of motion R(R), R(L) in FIG. 5) may each correspond to a respective signal indicating a maximum allowed curvature $\kappa_{max}$ (i.e., most acute trajectory or smallest radius of curvature) of a path of travel of the trailer 12 that is allowed by the controller 54, chosen to be less than a limiting curvature corresponding to a jackknife condition.

With additional reference to FIG. 6, a driver can turn the rotatable knob 66 to provide a desired curvature $\kappa_2$, within the available ranges of directional positions, while the driver of the vehicle 14 backs the trailer 12. In the illustrated embodiment, the rotatable knob 66 rotates about a central axis between a center or middle position 114 corresponding to a substantially straight backing path 60, 114 of travel (i.e. zero curvature), as defined by the longitudinal axis of the trailer 12, and various rotated positions 116, 118, 120, 122 on opposing sides of the middle position 114, commanding a desired curvature $\kappa_2$ (which may be referred to as the "curvature command") corresponding to a radius of the desired backing path 60 of travel for the trailer 12 at the corresponding one of the commanded rotated positions 116, 118, 120, 122. It is contemplated that the rotatable knob 66 may be configured in accordance with embodiments of the disclosed subject matter and omit a means for being biased to an at-rest position P(AR) between opposing rotational ranges of motion. Lack of such biasing may allow a current rotational position of the rotatable knob 66 to be maintained until the rotational control input device is manually moved to a different position.

As can, thusly, be appreciated based on the foregoing, the availability of a measurement or estimate for the hitch angle $\gamma$ is necessary to control backing of trailer 12 by vehicle 14 including the above-described trailer backup assist system 52 to control the steering angle $\delta$ for achieving and maintaining the desired curvature $\kappa_2$ for backing path 60. In this manner, hitch angle sensor assembly 10 is useable to provide data from sensors 26 that can be used by controller 54 to determine the instantaneous hitch angle $\gamma$ of the vehicle 14 and trailer 12 combination. It is also noted that other types of trailer backup assistance systems also require a measurement of the hitch angle $\gamma$, including those in which a control input directly corresponds with a desired hitch angle $\gamma$ or trailer 12 position with respect to vehicle 14. In a manner similar to that which is described below, hitch angle sensor assembly 10 can also be used, as described herein, to provide the needed measurement for hitch angle $\gamma$ in such systems as well.

Figure 7:
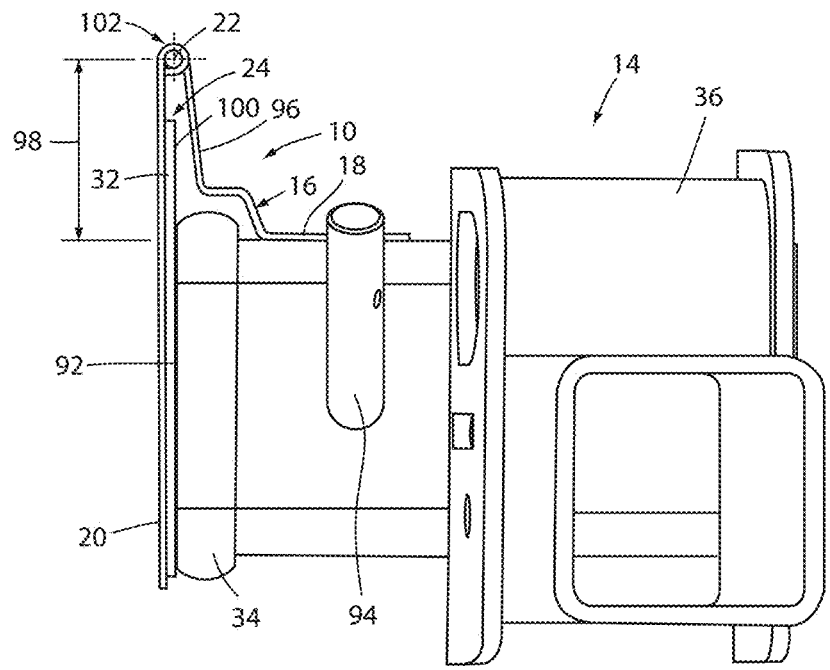
FIG. 7 is a side view of the hitch angle sensor assembly in a closed position over a hitch receiver in an unused condition.

As shown in FIG. 7, the body 20 of the hitch angle sensor assembly 10 is closeable over an open end 92 of the hitch receiver 34 under a biasing force between mounting bracket 16 and body 30 when no ball mount 42 is coupled within receiver 34. In this manner, hitch angle sensor assembly 10 can act as a cover for open end 92 of receiver 34 when the vehicle 14 is not being used for towing. As also shown in FIG. 1 this biasing of body 20 toward receiver 34 is such that face 32 of body 20 on which sensor array 24 is positioned is disposed toward open end 92 with at least a portion of sensor array 24 being disposed against receiver 34, depending on the geometry of both sensor array 24 and of receiver 34, adjacent open end 92. Mounting bracket 16 includes an extension portion 96 extending away from the base 18 to position the axis 22, about with body 20 rotates, in a desired location (as discussed further below). When body 20 is in the position shown in FIG. 7, it can further be seen that body 20, including a portion of face 32, is positioned adjacent to and extending generally along extension portion 96. Such positioning is achieved, in part, by the configuration of base 18, which extends along receiver 34 away from extension portion 96 and, thus, away from open end 92 and body 20 when body 20 is in the illustrated position. Accordingly, axis 22 is spaced in a longitudinal direction with respect to receiver 34 such that body 20 can rotate about axis 22 into the illustrated position, in which body 20 covers open end 92 of receiver 34. In one example, hitch angle sensor assembly 10 is affixable with receiver 34 by coupling base 18 with receiver 34, including using bolts, screws or the like to engage with holes that may be formed and tapped in receiver 34. Alternatively base 18 can be glued or welded to receiver 34 or can include additional features to allow mounting bracket 16 to snap onto or otherwise removeably engage with receiver 34.

Figure 9:
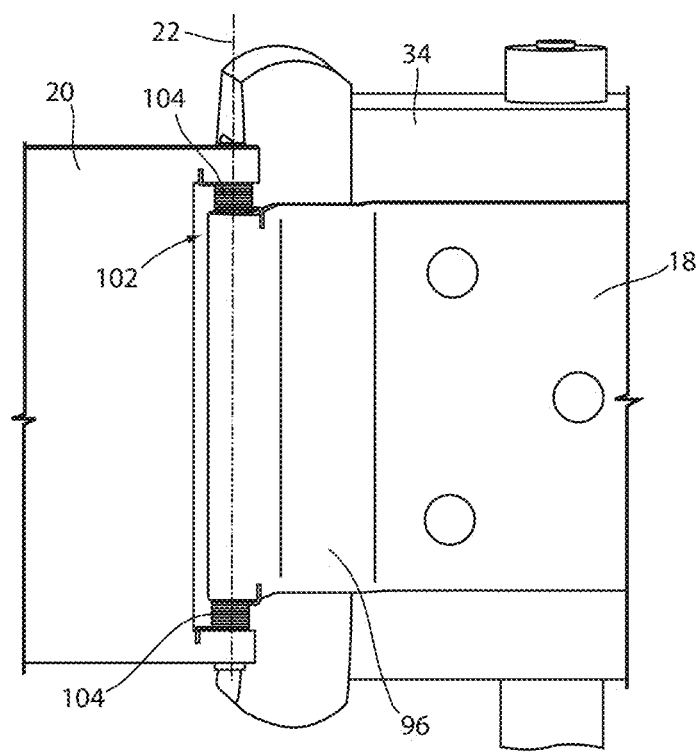
FIG. 9 is a top detail view showing the assembly of a body of the hitch angle sensor assembly to a mounting bracket thereof.

As further shown in FIG. 1, and as also shown in FIGS. 8 and 9, body 20 is rotatable against the biasing force in direction 95 so as to be moveable away from open end 92 of receiver 34. In one aspect, this movement allows the above-described ball mount 42 to be assembled with receiver 34, including by securing the position of ball mount 42 in receiver 34 with pin 94, ball mount 42 having coupled therewith hitch ball 44 for engagement of trailer 12 therewith. Accordingly, rotation of body 20 away from open end 92 of receiver 34 can allow such assembly and can accommodate the positioning of hitch ball 44 with body 20 rotated upwardly by a sufficient distance to clear hitch ball 44. In instances when ball mount 42 is assembled with receiver 34, but no trailer 12 is coupled with vehicle 14, the biasing of body 20 in direction 95 can maintain a portion of sensor array 24 (FIG. 7) in contact with hitch ball 44 such that, for example, body 20 and/or sensor array 24 do not vibrate against hitch ball 44, but are generally maintained in contact therewith.

As shown in FIG. 8, the upward rotation of body 20 against the biasing force is primarily associated with positioning of body 20 above at least one of the tongue 50 or the coupler 46 when trailer 12 is coupled with vehicle 14 by engagement of coupler 46 with hitch ball 44. In this manner, the biasing of body 20 in direction 95 urges face 32 (FIG. 7) toward coupler 46 and/or tongue 50 such that at least a portion of sensor array 24 (FIG. 7) is pressed against coupler 46 and/or tongue 50. In this manner, sensors 26 can be pressure-sensitive or pressure-activated sensors IEEE protecto-sensors, which can include combinations of low- and high-pressure activated switches embedded or otherwise carried in rubber sleeves. The rubber sleeves can be carried on a common film such that the sensor array 24 is a discrete unit. In other aspects, sensors 26 can be individually mounted in an array on face 32 of body 20 or another intermediate carrier bonded to face 32. Further, the sensor array 24 can be covered by an additional layer 100 overlying sensor array 24. In various examples, the layer 100 can be of an acceptably durable rubber, elastomeric, or plastic layer that can transmit pressure of body 20 toward the underlying portion of trailer 12 to the sensors 26 in array 24 positioned under layer 100. The durability of layer 100 can be such that layer 100 can withstand the varying temperature and elements that trailer 12 may encounter, as well as repeated load cycling that occurs during use of hitch angle sensor assembly 10, as described herein. Still further, the fixed lateral position of body 20 is such that trailer 12 moves with respect to body 20 in the direction of the underlying ground plane (and about coupling point 48). As described further below, this movement, or articulation, of trailer 12 with respect to body 20 corresponds with a change in hitch angle γ and facilitates measurement of the hitch angle γ by way of sensor array 24. Accordingly, layer 100 can be configured to allow the portion of trailer 12 in contact with layer 100 to move with respect thereto, while layer 100 is pressed thereagainst, particularly such that the portions of trailer 12 and layer 100 in mutual contact changes with the hitch angle γ.

To accommodate coupler 46 and/or tongue 50 beneath body 20, axis 22 about which body 20 rotates is positioned at a distance 98 from base 18 that maintains axis 22 at a position generally level with, or slightly above, an uppermost surface of trailer 12 in the area of contact with layer 100. As shown, such portion may be defined on an upper surface of coupler 46. Such a portion may also vary between coupler 46 and tongue 50, depending on the configuration of trailer 12 and the lateral distance to which body 20 extends. In another example, coupler 46 may include a locking lever, as is generally known in the art, that defines an upper surface when in a locked position that is smaller than the upper surface of coupler 46. Accordingly distance 98 can be configured to appropriately position axis 22 as needed to position body 20 over such an uppermost surface. It is noted that the configuration of ball mount 42 can also affect the positioning of the portion of trailer 12 contacted by layer 100 by positioning ball mount 42 in varying vertical positions with respect to receiver 34. In some instances, the configuration of ball mount 42 and the corresponding positioning of hitch ball 44 can be determined based on receiver 34 location on vehicle 14, with a relatively higher riding vehicle 14, or a receiver 34 positioned within bumper 40, having a ball mount 42 achieving a lower hitch ball 44 positioning. In such instances, the location of the contacted surface of a given trailer 12 or set of trailers 12 useable with vehicle 14 can be known to be within a given range with respect to receiver 34. In this and other examples, such as where hitch angle sensor assembly 10 is designated as being useable with a straight ball mount 42, such as that which is shown in FIG. 8, the relative height of the contacted portion of trailer 12 can be determined within a range such that the angular positioning of body 20 with respect to mounting bracket 16 can compensate for minor variations in the height of such an area, such as by using trailers 12 of slightly different configurations with vehicle 14 including hitch angle sensor assembly 10. In such instances, the distance 98, at which axis 22 is positioned above base 18, can be fixed, such as at a distance between 5 cm and 10 cm, for example. In other instances, it may be advantageous to structure mounting bracket 16 such that distance 98 is adjustable. In various examples, such adjustability may be achieved by making extension portion 96 a multi-component telescoping structure, or the like, or by making extension portion 96 fixably rotatable with respect to base 18. Such configurations may allow a user to adjust the location of axis 22 to correspond with various contact areas with trailer 12 afforded by different trailers 12 with which hitch angle sensor assembly 10 may be used.

In any of the above-described configurations of mounting bracket 16, axis 22 can be positioned above receiver 34 by distance 98 such that body 20 is generally parallel with the portion of trailer 12 (e.g., coupler 46, tongue 50, lever lock, or the like). In this manner, the overall area of sensor array 24 and/or layer 100 that can be positioned in contact with trailer 12 can be maximized for potentially greater resolution in detecting the hitch angle γ, as described below. In various implementations, sensor array 24 can be embedded in a generally compliant material, and layer 100 may be generally flexible and/or compressible. In this manner, all or an acceptably significant portion of sensor array 24 can be in contact with the portion of trailer underlying body 20 without body 20 being precisely parallel with coupler 46 and/or tongue 50 of trailer 12. In one example, body 20 can be considered as generally parallel with the underlying portion of trailer 12 if it is within about 15° of parallel therewith. In another example, body 20 can be considered as generally parallel with the underlying portion of trailer 12 if, given the configuration of trailer 12 and of hitch angle sensor assembly 10 (including the materials thereof, as discussed above) is such that at least 50% of the individual sensors 26 in sensor array 24 overlying the portion of trailer 12 beneath body 20 are in contact with or otherwise activated by such portion of trailer 12 at some point in the range of possible hitch angles γ.

Figure 10:
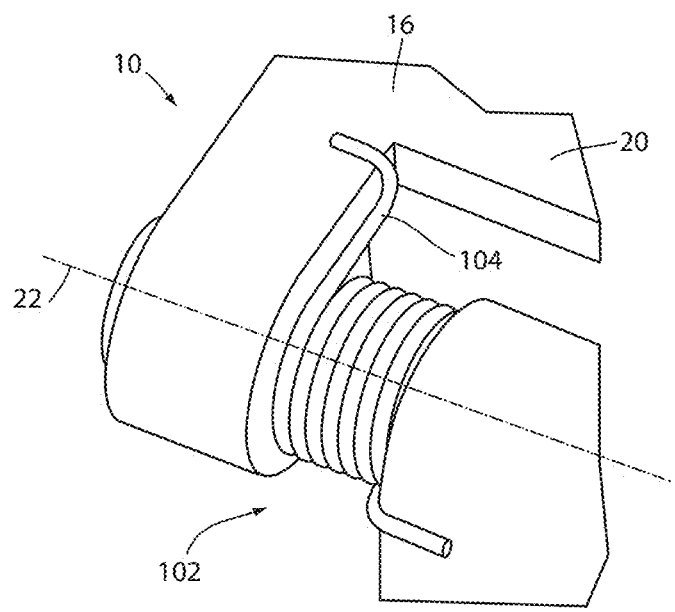
FIG. 10 is a perspective detail view of a coupling point of the body with the mounting bracket of the hitch angle sensor assembly.

As shown in FIGS. 9 and 10, the articulation of body 20 about axis 22 is achieved by a hinge 102 with respective portions incorporated into or otherwise coupled with body 20 and extension portion 96 of mounting bracket 16. The above-described biasing of body in direction 95 with respect to mounting bracket 16 can be achieved by the engagement of one or more springs 104 with body 20 and mounting bracket 16. As shown, two such springs 104 can be included on opposite sides of body 20 and positioned about axis 22, such as by positioning springs 104 in the form of coil springs about a pin associated with hinge 102. The spring 104 or springs 104 included in hitch angle sensor assembly 10 can be configured to provide a desired biasing force in direction 95, for example, such that the variable spring force achieved thereby in the above-described generally parallel position of body 20 with respect to the underlying portion of trailer 12 to activate any sensors 26 in the area of contact between sensor array 24 and trailer 12. Further, the spring force can be of a force determined to be sufficient to maintain contact between at least a portion of sensor array 24 with a portion of trailer 12 during reversing of trailer 12 using vehicle 14 under a variety of conditions, including during driving over bumps or other surface features that may cause jarring or abrupt movement of one or more of vehicle 14 and trailer 12.

Figure 11:
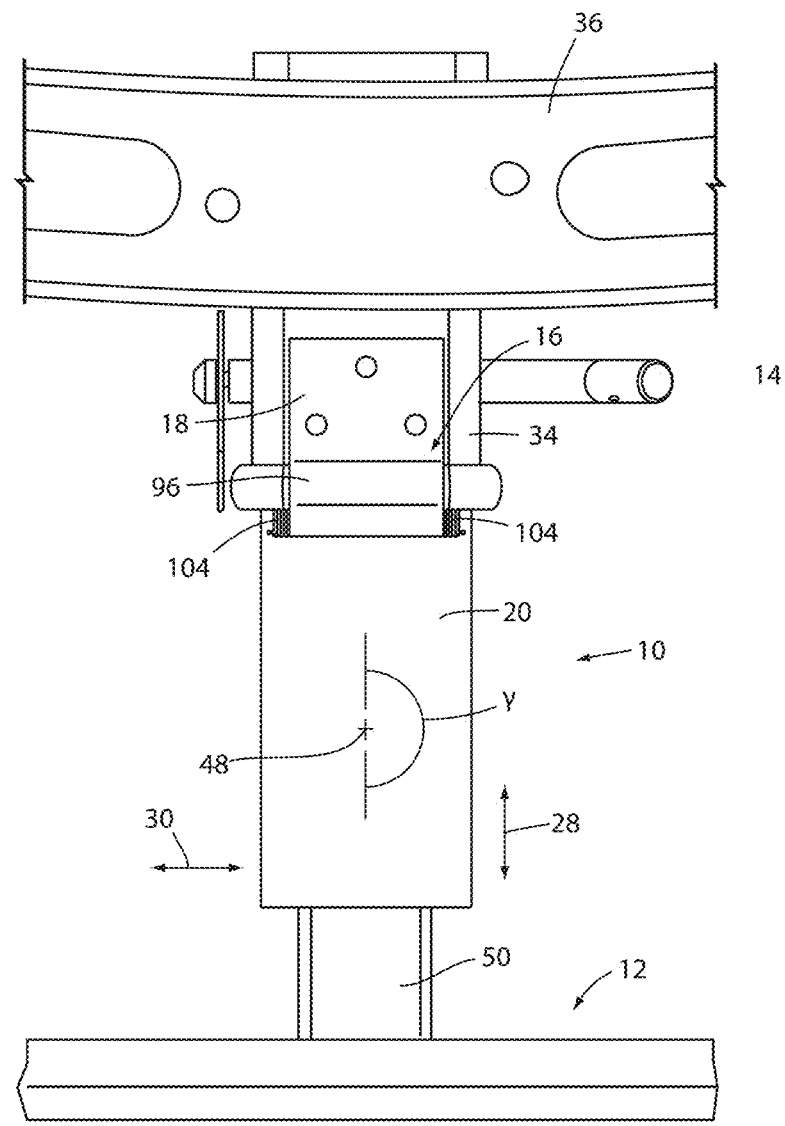
FIG. 11 is an overhead detail view of a trailer coupled with a vehicle including the hitch angle sensor assembly, the trailer being shown in a first position with respect to the vehicle.

As shown in FIG. 11, with body 20 fixed to hitch receiver 34 by way of mounting bracket 16, the position of body 20 with respect to trailer 12 will vary with the hitch angle γ. In this manner, when body 20 is appropriately configured, such as by the dimensions thereof and the quantity of sensors 26 (FIG. 12) included in the sensor array 24 (FIG. 12) thereon, as well as the spacing of sensors 26, for example, data obtained from sensors 26 can be used by trailer backup assist system 52 (FIG. 3) to measure the hitch angle γ within a degree of certainty acceptable for use by curvature routine 134 (FIG. 3). As further shown in FIGS. 12-14, various ones of the sensors 26 in sensor array 24 are activated by contact between the sensor array 24 and the portion of the trailer 12, including coupler 46 and/or tongue 50, beneath body 20, depending on the position of the trailer 12 relative to the vehicle 14. In this manner, controller 54 can determine the hitch angle γ based on input received from the plurality of sensors 26, which may be done either directly or via a readout circuit that outputs data indicative of the states of the individual sensors 26 in a single data stream. Controller 54 (FIG. 3) can the process the data relating to activated and inactivated ones of the plurality of sensors 26 to determine the hitch angle γ.

Figure 12:
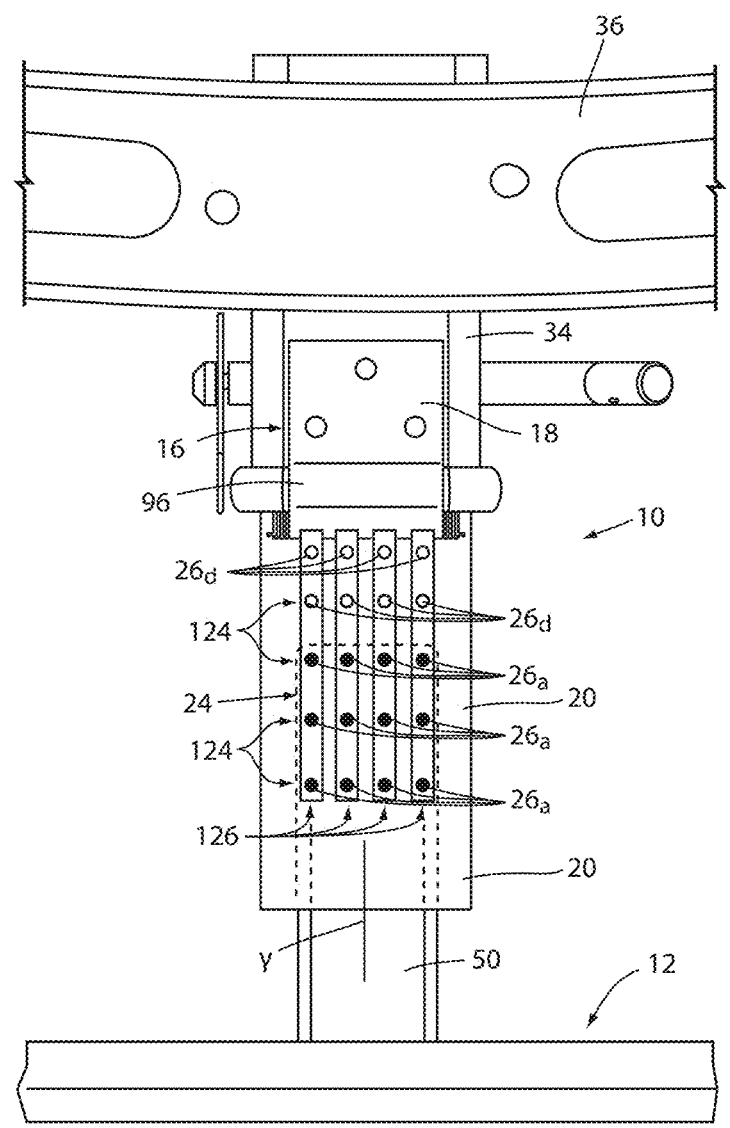
FIG. 12 is the overhead detail view of the trailer coupled with the vehicle with the trailer being shown in a first position with respect to the vehicle and contact of a portion of the hitch angle sensor assembly with the trailer activating various sensors included therein.
Figure 13:
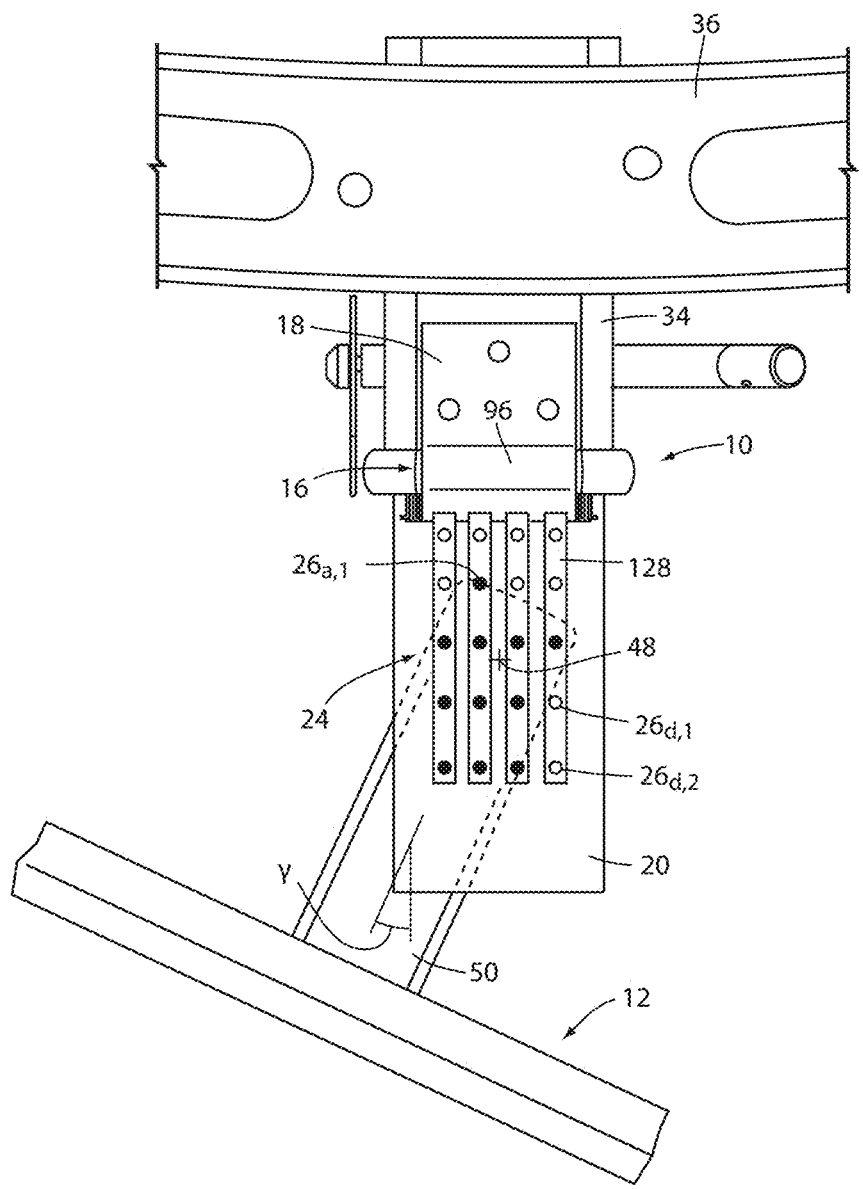
FIG. 13 is a further overhead detail view of the trailer coupled with the vehicle with the trailer being shown in a second position with respect to the vehicle and contact of a portion of the hitch angle sensor assembly with the trailer activating various sensors included therein.
Figure 14:
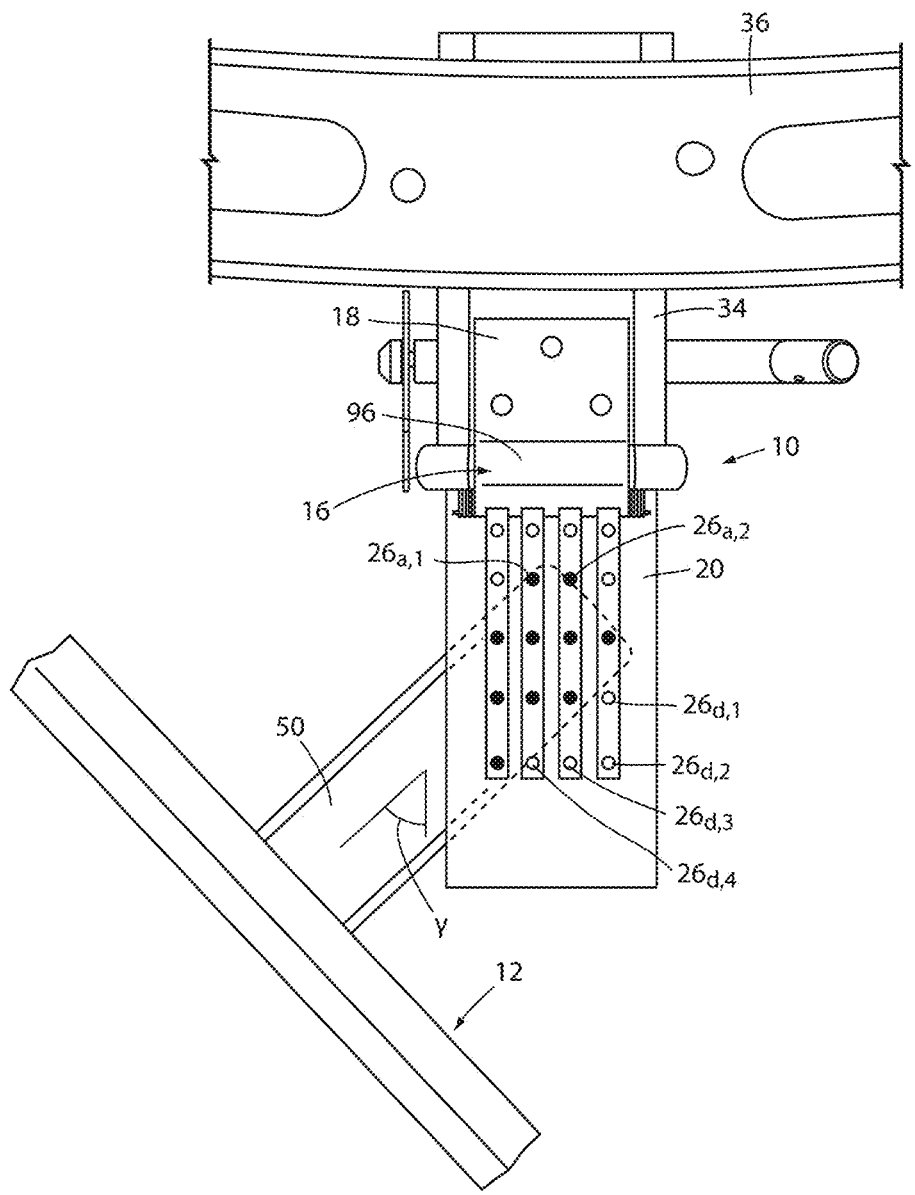
FIG. 14 is a further overhead detail view of the trailer coupled with the vehicle with the trailer being shown in a third position with respect to the vehicle and contact of a portion of the hitch angle sensor assembly with the trailer activating various sensors included therein.

As further shown in FIGS. 12-14, the plurality of sensors 26 in sensor array 24 can be arranged in a plurality of rows 124 and columns 126 such that sensors 26 extend over at least a portion of body 20 in a grid. In this manner, each of the sensors 26 can have an identifying factor or marker (such as a particular identifying signal associated directly therewith or added by way of an associated readout circuit) associated with its location. Accordingly, controller 54 can obtain data from hitch angle sensor assembly 10, including the various ones of sensors 26 that are activated by contact between sensor array 24 and trailer 12 and their location. Controller 54 can then use the data to derive a measurement for the hitch angle γ using an appropriate scheme. For example, acting under the assumption that the coupler 46 and at least the immediately adjacent portion of tongue 50 is of an elongate, symmetrical shape (most often rectangular, at least in the portion contacted by sensor array 24, as shown in FIG. 8), controller 54 can be programmed to infer that an elongate pattern of activated sensors 26a that is approximately symmetrically arranged with respect to body 20 and/or sensor array 24 indicates a hitch angle γ of zero, as shown in FIG. 12.

As shown in FIG. 13, rotation of trailer 12 about the coupling point 48 between hitch ball 44 and coupler 46 causes the particular ones of sensors 26 activated by contact between sensor array 24 and trailer 12 to change. In particular, certain ones of sensors $26_{d,1}$ and $26_{d,2}$ can become deactivated as trailer 12 moves toward a side of body 20 opposite therefrom (and, accordingly, moving away from sensors $26_{d,1}$ and $26_{d,2}$), while an additional sensor $26_{a,1}$ can become activated. In this manner, a pattern of activated sensors $26_a$ can be characterized as an image of the portion of trailer 12 contacted by sensor array 24. Such an image can be analyzed in various ways to determine a measurement for hitch angle γ. For example, the image of activated sensors $26_a$ can be processed to determine at least one of a centerline and at least one edge thereof, either or both of which can be used to determine the hitch angle γ, such as by averaging, weighting, or the like. In other examples, controller 54 can be pre-programmed with various sets of activated $26_a$ and/or deactivated sensors $26_d$ that correspond with various hitch angles γ according to various step functions, lookup table results, and the like.

Turning to FIG. 14, further rotation of trailer 12 about coupling point 48 causes further ones of sensors $26_{d,3}$ and $26_{d,4}$ to become deactivated, as trailer 12 moves away from and out of contact with the portions of sensor array 24 corresponding with such sensors 26. Still further, an additional one of sensors $26_{a,2}$ becomes activated by contact of trailer 12 with the corresponding area of sensor array 24. As discussed above, controller 54 can use this sensor data to determine the corresponding hitch angle γ. In the illustrated example, where sensor array 24 includes sensors 26 arranged in five rows 124 (extending parallel to and progressively away from axis 22) and four columns 126, for a total of twenty sensors 26, the activation and deactivation of sensors 26 described above may correspond with a range of hitch angles γ. In this manner, a greater resolution for sensor array 24 can be achieved by including a greater number of sensors 26 within a given area (i.e. for a greater sensor 26 density). For example, a sensor array 24 with four or nine sensors 26 per square inch thereof can be employed over a body measuring approximately 3 inches by 6 inches. As shown, the sensors 26 can be arranged in stripes 128 (FIG. 13) with a predetermined spacing therebetween in the direction of rows 124 with the column 126 spacing achieved by the relative positioning of the stripes 128.

Figure 15:
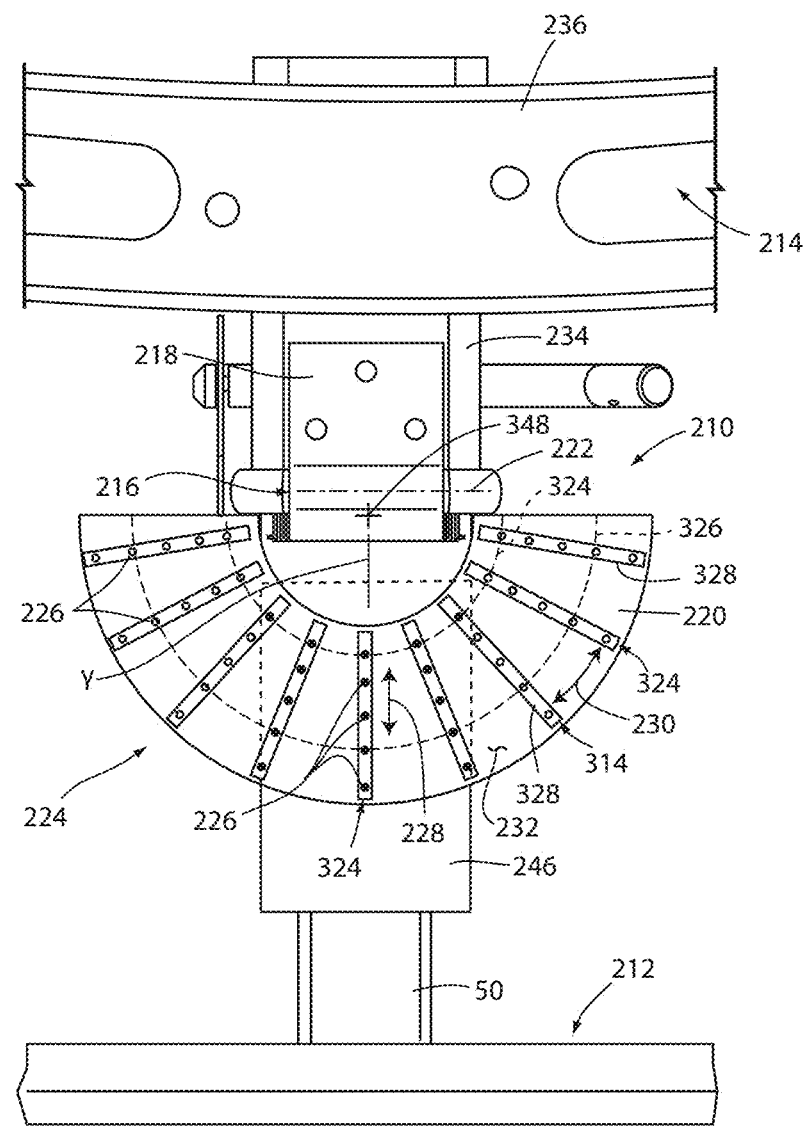
FIG. 15 is an overhead view of an alternative hitch angle sensor assembly coupled with a vehicle and associated with a trailer coupled with the vehicle.

An alternative embodiment of a hitch angle sensor assembly 210 is shown in FIG. 15 and, in a similar manner to hitch angle sensor assembly 10, discussed above, has a mounting bracket 216 having a base 218 and a body 220 rotatably coupled with the bracket 216 about an axis 222 that is spaced apart from the base 218 and is biased toward the base 218. The hitch angle sensor assembly 210 also includes a sensor array 224 including a plurality of sensors 226 extending in a first direction 228 and a second direction 230 along a face 232 of the body 220. In the present embodiment, however, the first direction 228 in which the sensors 226 in the sensor array 224 extend is a radial direction, comprising a plurality of rays 324 extending from a common projected origin 348 and the second direction 230 in which the sensors 226 extend is an arcuate direction, consisting of a plurality of arcs 326 emanating in a concentric manner from origin 348.

As shown, the hitch angle sensor assembly 210 is affixable with the vehicle 214, particularly to a hitch ball receiver 234 rigidly coupled with a tow bar 236 that is, in turn coupled with the frame of the vehicle 214 to rigidly retain receiver 234 with vehicle 214. Receiver 234 is configured to receive a ball mount (not show, but similar to ball mount 42 shown in FIG. 8) for coupling of a hitch ball (not show, but similar to ball mount 48 shown in FIG. 8) to the rear of vehicle 214 with trailer 212 coupled with vehicle 214 by a coupler 246 that engages with the hitch ball. In this arrangement, body 220 is configured in a semi-circular shape such that the rays 324 of the sensors (which may be arranged in corresponding strips 328, as shown) fan out over an angular area corresponding generally with a potentially acceptable range of hitch angles γ (e.g., about 180 degrees +/−10 degrees). In this manner, at varying positions of trailer 212, one or more complete rays 324 of sensors 226 may be in contact with trailer 212 with additional partial ray 314 of sensors 226 also in contact with trailer 212. Such a sensor array 224 may allow for determination of the hitch angle γ in a similar manner to that which is discussed above, with the sensors 226 in the various rays 324 being associated with angular positions corresponding with particular hitch angles γ or ranges thereof.

It is to be understood that variations and modifications can be made on the aforementioned structure without departing from the concepts of the present disclosure, and further it is to be understood that such concepts are intended to be covered by the following claims unless these claims by their language expressly state otherwise.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the disclosure as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present disclosure. The exemplary structures and processes disclosed herein are for illustrative purposes and are not to be construed as limiting.

What is claimed is:

1. A vehicle-trailer hitch angle sensor assembly, comprising:
   a mounting bracket including a base;
   a body rotatably coupled with the bracket about an axis spaced apart from the base and biased toward the base;
   a sensor array including a plurality of pressure-activated sensors extending in first and second directions along a face of the body.

2. The hitch angle sensor assembly of claim 1, wherein:
   the mounting bracket further includes an extension portion extending away from the base to the axis; and
   the body is biased toward the base into a first position wherein a portion of the face is positioned adjacent the extension portion of the mounting bracket.

3. The hitch angle sensor assembly of claim 2, wherein the base extends away from the body when in the first position.

4. The hitch angle sensor assembly of claim 1, wherein the body is rotatably coupled with the mounting bracket about a hinge having respective first and second portions defined by the body and the mounting bracket.

5. The hitch angle sensor assembly of claim 4, further including a spring operably engaged between the mounting bracket and the body; wherein:
   the spring biases the body toward the base.

6. The hitch angle sensor assembly of claim 1, wherein the plurality of sensors in the sensor array extend away from the axis in the first direction in a plurality of rows and generally parallel with the axis in the second direction in a plurality of columns.

7. The hitch angle sensor assembly of claim 1, wherein:
   the first direction in which the plurality of sensors in the sensor array extend is a radial direction and the second direction in which the plurality of sensors extend is an arcuate direction; and
   the plurality of sensors in the sensor array extend in the first direction in a plurality of rays having a common origin and in the second direction in a plurality of concentric arcs about the common origin.

8. A system for assisting in reversing of a vehicle-trailer combination, comprising:
   a vehicle steering system;
   a sensor assembly, comprising:
      a mounting bracket coupled with a receiver of a vehicle;
      a body rotatably coupled with the mounting bracket about an axis spaced apart from the receiver and biased toward the receiver; and
      a sensor array including a plurality of sensors extending in first and second directions along a face of the body; and
   a controller in electronic communication with the sensor array determining a hitch angle between a trailer and the vehicle in the vehicle-trailer combination based on an input from the plurality of sensors.

9. The system of claim 8, wherein the controller further outputs a steering signal to the vehicle steering system to maintain the vehicle-trailer combination along a predetermined backing path based on the hitch angle.

10. The system of claim 9, wherein the predetermined backing path corresponds with a trailer curvature input received by the controller.

11. The system of claim 8, wherein: the biasing of the body toward the receiver maintains at least a portion of the sensor array against a portion of the trailer when articulably coupled with a hitch ball coupled with the receiver, the hitch angle being defined between the portion of the trailer and the receiver.

12. The system of claim 11, wherein:
   various ones of the plurality of sensors are activated by contact between the sensor array and the portion of the trailer based on a position of the trailer relative to the vehicle; and the controller determines the hitch angle based on the input from the plurality of sensors including data relating to activated and inactivated ones of the plurality of sensors.

13. The system of claim 11, wherein the axis is spaced apart from the receiver such that the body extends generally parallel with the portion of the trailer when at least the portion of the sensor array is maintained against the portion of the trailer.

14. A vehicle, comprising:
a hitch receiver coupled with a frame of the vehicle and exposed at a rear of the vehicle;
a sensor assembly, comprising:
  a mounting bracket coupled with the hitch receiver;
  a body rotatably coupled with the mounting bracket about an axis spaced apart from the hitch receiver and biased toward the hitch receiver;
  a sensor array including a plurality of pressure-activated sensors extending in first and second directions along a face of the body.

15. The vehicle of claim 14, wherein the body of the sensor assembly is closeable over an opening in the hitch receiver under a biasing force biasing the body toward the hitch receiver.

16. The vehicle of claim 14, further including a ball mount coupled with the hitch receiver and including a hitch ball thereon, wherein:
the body is rotatable about the axis with respect to the hitch receiver to accommodate the hitch receiver and hitch ball when the ball mount is coupled with the hitch receiver, and is further rotatable about the axis to accommodate a hitch coupling of a trailer to couple the trailer to the vehicle with the body biased toward a portion of the trailer to maintain at least a portion of the sensor array in contact with the portion of the trailer.

17. The vehicle of claim 16, wherein the axis is positioned above the receiver by a distance such that the body can accommodate the hitch coupling of the trailer and such that the body is generally parallel with the portion of the trailer.

18. The vehicle of claim 14, wherein the plurality of sensors in the sensor array extend away from the axis in the first direction in a plurality of rows and generally parallel with the axis in the second direction in a plurality of columns.

19. The vehicle of claim 14, wherein:
the first direction in which the plurality of sensors in the sensor array extend is a radial direction and the second direction in which the plurality of sensors extend is an arcuate direction; and
the plurality of sensors in the sensor array extend in the first direction in a plurality of rays having a common origin and in the second direction in a plurality of concentric arcs about the common origin.

20. The vehicle of claim 14, further including a controller in electronic communication with the sensor array and a steering system in electronic communication with the controller, the controller:
determining a hitch angle between a trailer coupled with the vehicle and the vehicle based on an input from the plurality of sensors; and
outputting a steering signal to the steering system to maintain the vehicle and the trailer along a predetermined backing path based on the hitch angle.

* * * * *